L. P. LOCKE.
PLUNGER FOR FORMING INSULATORS.
APPLICATION FILED AUG. 11, 1913.
1,198,732.
Patented Sept. 19, 1916.
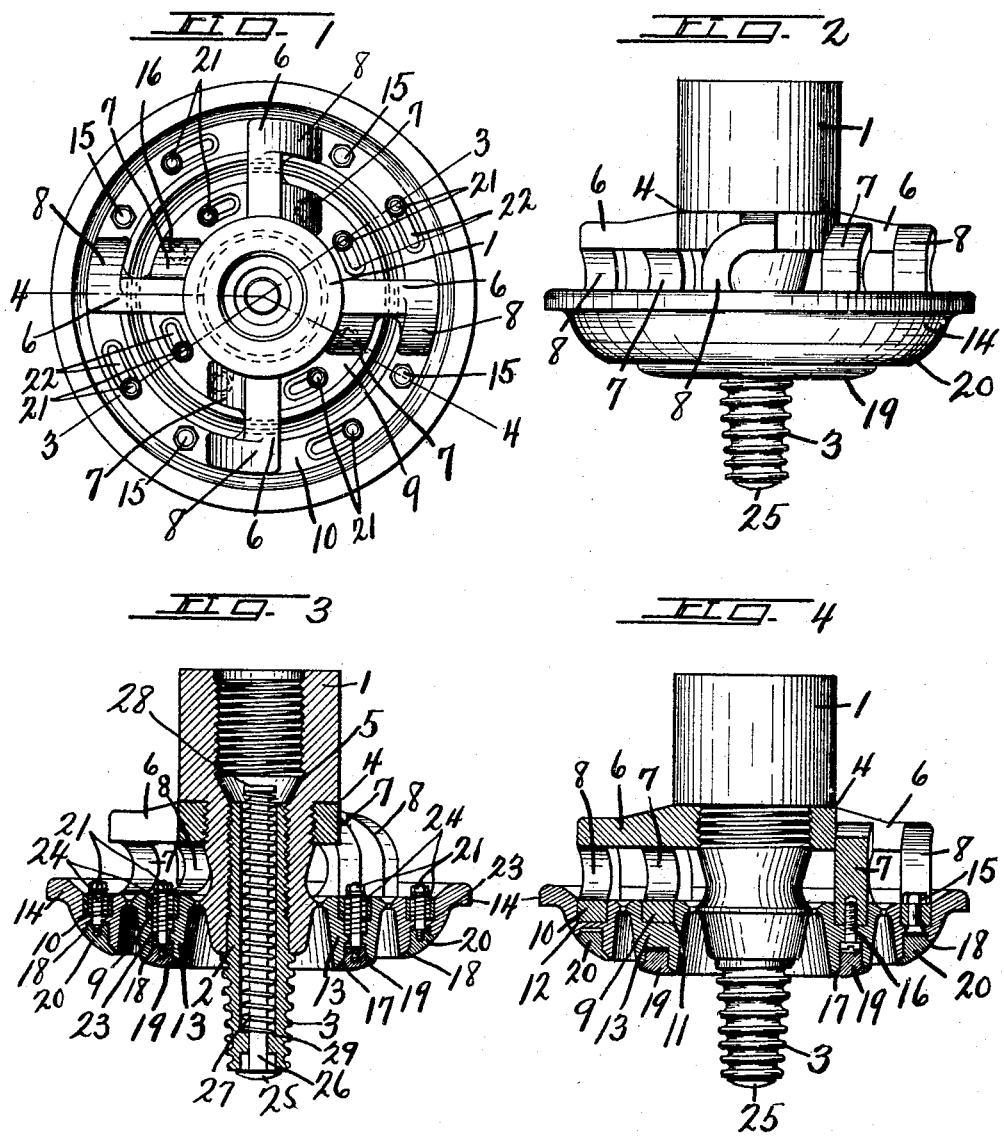
Witnesses:
H. Hurst
E. A. Thompson
Louis P. Locke
Inventor
By Howard P. Denison
Attorney.

UNITED STATES PATENT OFFICE.

LOUIS PEER LOCKE, OF VICTOR, NEW YORK, ASSIGNOR TO LOCKE INSULATOR MFG. CO., OF VICTOR, NEW YORK, A CORPORATION OF NEW YORK.

PLUNGER FOR FORMING INSULATORS.

1,198,732.   Specification of Letters Patent.   Patented Sept. 19, 1916.

Application filed August 11, 1913. Serial No. 784,179.

*To all whom it may concern:*

Be it known that I, LOUIS P. LOCKE, of Victor, in the county of Ontario, in the State of New York, have invented new and useful Improvements in Plungers for Forming Insulators, of which the following, taken in connection with the accompanying drawings, is a full, clear, and exact description.

This invention relates to certain improvements in plungers or dies for use in the manufacture of hollow earthenware and refers more particularly to a plunger or die for use in the formation of the interior petticoats and threads of hollow insulators.

It is well known, among those familiar with the art, that great difficulty has been experienced in producing a smooth interior surface for the reason that the plastic material would adhere to the surface of the plunger or die and be drawn along by the suction of the plunger as it starts in its outward movement.

The primary object, therefore, of my invention is to provide means for equalizing the air pressure as the plunger is drawn from the plastic body.

Another object is to construct the plunger of separate rings equal in number to the number of petticoats to be formed in the plastic material and to support these rings from a common spider-like member and to so space the rings as to provide circumferential openings between them so that when the plunger moves into the plastic body, the air is free to escape through these openings.

In the drawings—Figure 1 is a top plan view of the plunger. Fig. 2 is an elevation of the same. Fig. 3 is a cross section on line 3—3, Fig. 1. Fig. 4 is a cross section on line 4—4, Fig. 1.

The invention comprises a plunger formed of a substantially cylindrical hollow body member —1— having its lower portion interiorly threaded for the reception of an externally threaded sleeve —2— provided with a tapering threaded portion —3— adapted to form the threads within the insulator.

The member or section —1— is externally and internally enlarged at its upper portion to form a projecting ledge —4— upon its outer face and an annular seat —5— upon its inner face. The enlarged portion is also internally threaded for the reception of a rotary and vertically movable spindle (not shown). It will be apparent, however, that a spindle having simply a reciprocating movement may be used.

The member —1— is externally threaded just below the ledge —4— for the reception of a supporting member or spider formed of radiating arms —6— preferably integral with a common ring —30— internally threaded for engagement with the threaded portion of the member —1—. The arms —6— are each formed with laterally and downwardly projecting fingers —7— and —8— provided with circular connecting bands —9— and —10—, the band —9— preferably integral with all of the fingers —7— and the band —10— preferably integral with all of the fingers —8—. But it is apparent that the bands may be separate from the fingers and connected thereto in any suitable manner. These bands and fingers may be of any desired number and size depending upon the number of petticoats to be formed upon the insulator, and the size of the insulator desired.

The bands —9— and —10— are seated in circular recesses —11— and —12—, respectively, formed in the petticoat-forming rings —13— and —14—, respectively. Each band may be bolted to its respective ring by means of bolts —15—. The bands and the fingers may also be provided with internally threaded openings adapted to receive a threaded bolt —16—, best shown in Fig. 4 and dotted lines Fig. 1 and this construction is particularly advantageous for saving space in connection with the smaller of the concentric rings and may be used in the larger of the rings in combination with the bolts —15— to give greater strength to the device.

The rings —13— and —14— are spaced apart to leave a circumferential air vent between them and preferably each ring is provided with an annular channel or groove indicated in the inner ring by the numeral —17— and in the outer ring by the numeral —18— for the reception of circular valves —19— and —20— respectively. These valves are supported by bolts —21— mounted in slots —22— in the respective rings —13— and —14—. These slots are enlarged laterally to form annular seats —23— adapted to form bearings for the springs —24— tensioned to hold the valves in closed position.

The hollow sleeve —2— is provided with a valve —25— at its lower end preferably integral with a valve stem —26— extending upwardly through the sleeve and this valve is supported in closed position by a spring —27— confined between an enlargement or washer —28— upon the valve stem and an annular seat —29— formed within the hollow sleeve —2—.

It will now be readily apparent that in using a rotating plunger, which is at the same time moved longitudinally, with respect to an operating spindle, that, as the plunger is forced into the plastic material, the trapped air will escape through the circumferential air vents between the rings —13— and —14—. As the plunger starts rotating in its outward movement, the bolts —21— will slide for a short distance equal to the length of the slots —22— so that the valves —19— and —20— supported by these bolts may remain stationary by reason of the suction while the plunger is raised a short distance from the valves, thus allowing air to enter between the valve and the ring and equalize the air pressure.

It will also be apparent that with a plunger having a reciprocating movement into and out of the plastic material, not accompanied by a rotary movement, the slots —22— are unnecessary and the bolts may be seated in openings of substantially their own size and that the suction will hold the valves in contact with the plastic body against the action of the springs —24— as the plunger starts in its outward movement until sufficient air enters between the ring and the valve to automatically equalize the air pressure.

The invention herein is not limited to any particular number of rings but any number may be used corresponding to the number of petticoats to be formed upon the insulator and a valve may be used with all of the rings or any one of the rings alone without departing from the spirit of this invention as set forth in the appended claims.

What I claim is:

1. In a rotary and vertically movable die, an annular groove-forming member having a section vertically and circumferentially movable independently of the main body of said member so that said section may remain stationary while the main body of said member is rotated and vertically moved a predetermined distance.

2. In a plunger for forming insulators, a body portion having a plurality of radiating arms, an annular groove-forming member supported by said radiating arms, said member having a curved section vertically and circumferentially movable independently of the main body of said member so that said section may remain stationary while the main body of said member is rotated and vertically moved a predetermined distance.

3. In a plunger for forming insulators, a body portion having a plurality of radiating arms, a finger extending downwardly from each of said arms, an annular member having a groove in its lower face, attaching members having portions seated in said groove and extending upwardly through said annular member and engaged with said fingers, and a movable section seated in said groove and covering said attaching members.

In witness whereof I have hereunto set my hand this 30 day of July, 1913.

LOUIS PEER LOCKE.

Witnesses:
ALBERT A. LORD,
IRMA R. LOCKE.

Copies of this patent may be obtained for five cents each, by addressing the "Commissioner of Patents, Washington, D. C."